United States Patent
Kobori

[15] 3,650,223
[45] Mar. 21, 1972

[54] AIR BAG TABLE

[72] Inventor: Yasusaburo Kobori, Tokyo, Japan
[73] Assignee: Techikawa Spring Co., Ltd., Tokyo, Japan
[22] Filed: Sept. 4, 1970
[21] Appl. No.: 69,582

[52] U.S. Cl. .............................. 108/44, 248/1, 297/DIG. 3, 293/52 F, 293/71 P
[51] Int. Cl. ................................. A47b 23/00, A47b 37/00
[58] Field of Search .................... 108/44; 297/DIG. 3; 248/1; 293/52 F, 71 P

[56] References Cited

UNITED STATES PATENTS

| 2,680,523 | 6/1954 | Heeter | 108/44 |
| 2,834,606 | 5/1958 | Bertrand | 297/DIG. 3 |

FOREIGN PATENTS OR APPLICATIONS

824,354  8/1968  Canada..........................297/DIG. 3

*Primary Examiner*—Paul R. Gilliam
*Attorney*—Hill, Sherman, Meroni, Gross & Simpson

[57] ABSTRACT

An air bag table for use in vehicles having an air bag which can not stand by itself but is capable of being inflated with gas and forming a substantially flat plane at one portion thereof, a fixture for mounting the air bag on a desired portion in a vehicle compartment, a device for sealing gas in the air bag, and a pressure regulator, whereby when a vehicle passenger strikes against the inflated air bag, it automatically discharges the sealed gas from the air bag to safely protect the vehicle passenger.

7 Claims, 24 Drawing Figures

INVENTOR.
Yasusaburo Kobori

INVENTOR.
Yasusaburo Kobori

AIR BAG TABLE

BACKGROUND OF THE INVENTION

1. Field of the Invention

This invention relates to an air bag table, and more particularly to an air bag table which can be used not only as a table in vehicles such, for example, as automobiles, trains, airplanes and the like but also as a kind of safety device for protecting passengers from shocks when involved in a head-on collision and like accidents.

2. Description of the Prior Art

A folding or collapsible table is provided at the seat in, for example, an airplane but this table is usually made of wood or like relatively hard material, so that if a passenger should be thrown against such table in the event of a crash, he would be badly injured thereby. Namely, such a table is very dangerous once the vehicle has become involved in an accident. Accordingly, the table must be folded except when used. However, even if folded, the table is still dangerous for the human body because such a table heretofore employed in the vehicle is made of a hard material as above described.

SUMMARY OF THE INVENTION

One object of this invention is to provide a novel air bag table which is free from the aforementioned defect inevitably encountered in the conventional table and positively protects the life of vehicle passengers in the event of a collision.

Another object of this invention is to provide an air bag table which is readily installed, for example, on the seat of an automobile.

A further object of this invention is to provide a collapsible and inflatable air bag table.

Still a further object of this invention is to provide an air bag table which is provided with means for detecting an impact produced in the event of sudden braking or a crash of an automobile or the like and automatically deflating the inflated air bag table.

Other objects, features and advantages of this invention will become apparent from the following description taken in conjunction with the accompanying drawings.

DESCRIPTION OF THE PREFERRED EMBODIMENTS

A detailed description will be given of the air bag table 1 (an elastic inflatable bag) of this invention as being applied to an automobile.

Figure 1:
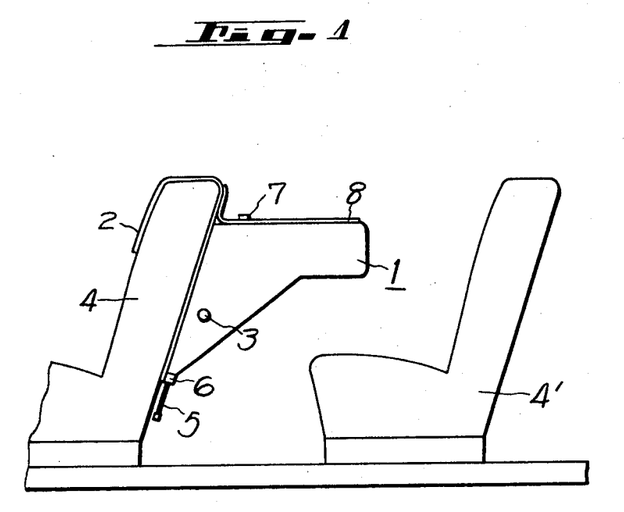
FIG. 1 is a side view showing one example of an air bag table of this invention when mounted on the seat of a vehicle.
Figure 2:
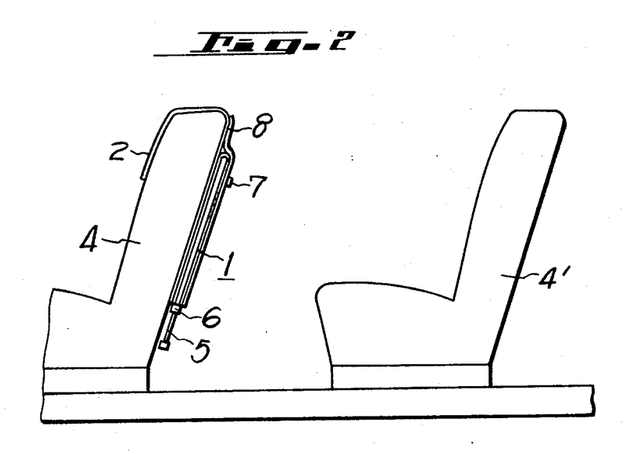
FIG. 2 is a side view of the air bag table in its deflated condition.

In FIG. 1 there is illustrated the air bag table 1 inflated with air. The air bag table 1 is made of cloth of nylon, polyethylene or like synthetic resin material which is airtight and abundant in elasticity. As shown in the figure the air bag table 1 is fixedly mounted, for example, on the back of the front seat 4 of the automobile by means of a fixture 2 made of, for example, a metal and attached to the air bag table 1. It will be seen that the air bag table 1 made of the aforementioned material does not stand itself but expands and stands itself when supplied with gas, for example, air pressure. The air bag table 1 is designed so that its one portion become flat when inflated. Reference numeral 3 indicates a pressure regulator such as an exhaust or safety valve, by means of which the gas sealed in the air bag table 1 is automatically discharged therefrom upon occurrence of an abnormal rise of the internal pressure of the air bag table 1 resulting from striking of a vehicle passenger against the air bag table 1 due to an external shock in the event of a crash or like accident. Reference numeral 5 designates a gas supply pipe for delivering, for example, air into the air bag table 1 and this pipe 5 is connected to a check valve 6 formed in the air bag table 1. Reference numeral 7 indicates an exhaust valve or plug for rapidly exhausting the air bag table 1 when the air bag table 1 is folded down. FIG. 2 is a side view of the air bag table 1 in its folded condition, in which the air bag table 1 is folded down closely to the back of the front seat 4 and scarcely occupies the space between the front seat 4 and the rear seat 4', and hence hardly impedes the passenger's movement.

Figure 3:
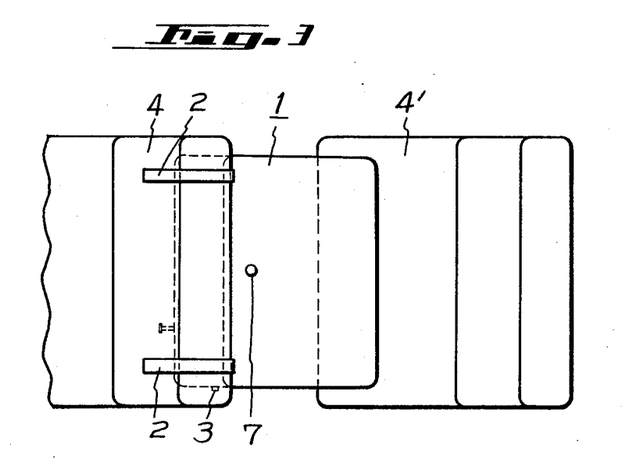
FIG. 3 is a top plan view of the air bag table shown in FIG. 1.
Figure 4:
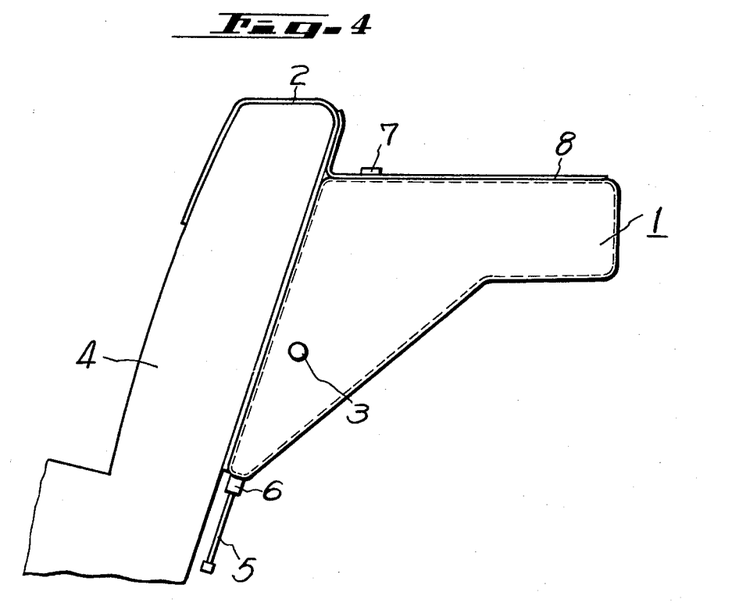
FIG. 4 is an enlarged side view of the principal portion of the air bag table depicted in FIG. 1.

FIGS. 3 and 4 are respectively enlarged top plan and side views of the air bag table 1. On the upper portion of the air bag table 1 there is attached a tablecloth or plate 8 formed of a relatively soft material such, for example, as rubber, plastic or the like, by which the upper portion of the air bag table 1 is held flat when the air bag table 1 is inflated with air. However, the tablecloth 8 may be dispensed with if the air bag table 1 is made thick at its upper portion.

Figure 5:
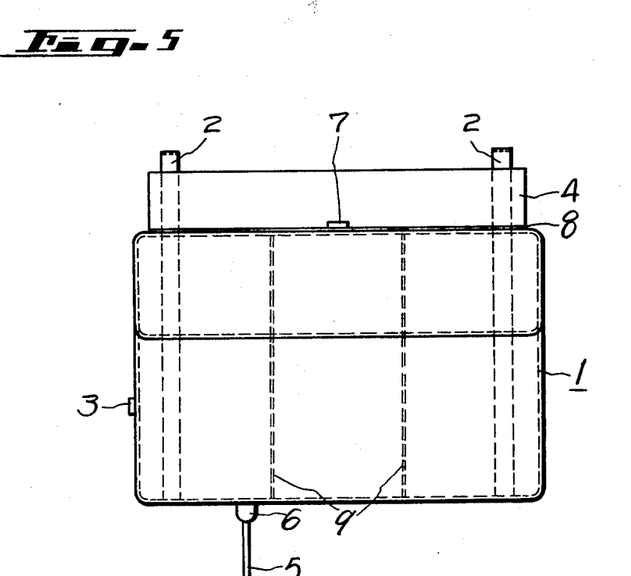
FIGS. 5 and 6 are a front view and a plan view of the principal portion of the air bag table shown in FIG. 4.
Figure 6:
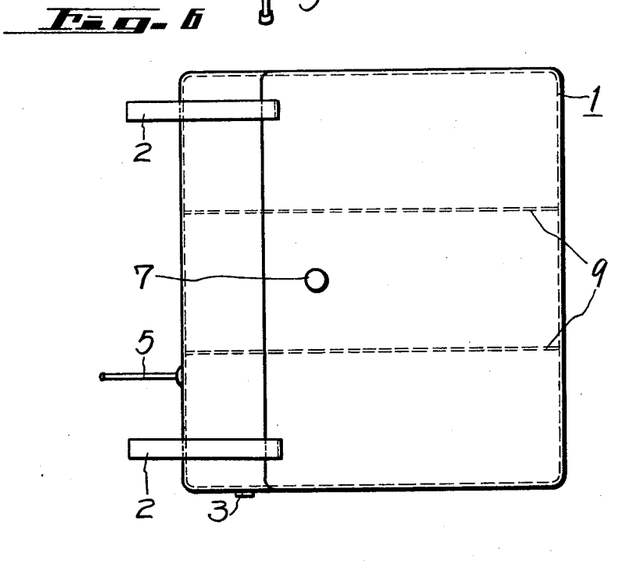

FIGS. 5 and 6 are enlarged front and plan views of the air bag table 1. As indicated by broken lines in the figures, the air bag table 1 may have provided therein plural, in the illustrated example two diaphragms or partition walls 9 for maintaining the air bag table 1 in such a predetermined shape as depicted when the air bag table is inflated. Namely, the air bag table 1 is divided by the diaphragms 9 into a plurality of rooms. In this case the diaphragms 9 have formed therein, for example, small apertures (not shown) to permit intercommunication of the rooms.

Figure 7:
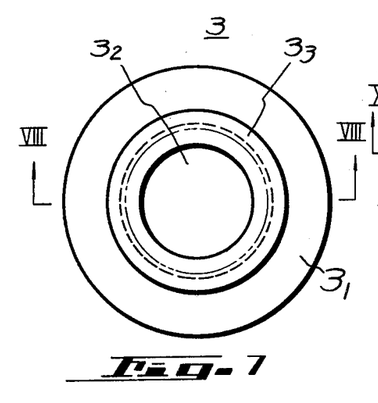
FIG. 7 is an enlarged plan view illustrating one example of a safety valve employed in the air bag table of this invention.
Figure 8:
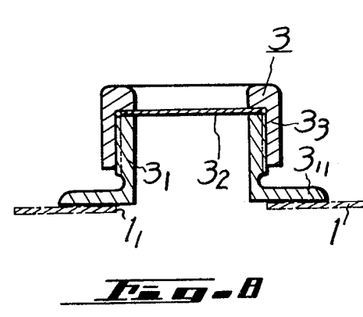
FIG. 8 is a longitudinal-sectional view taken along the line VIII—VIII in FIG. 7.

FIGS. 7 and 8 are respectively enlarged plan and cross-sectional views showing in detail one example of the aforementioned pressure regulator device 3. Reference numeral $3_1$ designates a tube as of plastic, whose flange $3_{11}$ is hermetically fastened to the margin of an opening $1_1$ of, for example, the side wall of the air bag table 1. The open end of the tube $3_1$ is sealed by a seal plate $3_2$ of a similar material to that of the tube $3_1$ and a seal plate retainer cap $3_3$ of a similar material is threadably engaged with the tube $3_1$ from the outside. With such an arrangement, when a passenger, for example, strikes against the air bag table 1 to cause a sudden rise of the internal pressure of the air bag table 1, the seal plate $3_2$ is ruptured to permit automatic deflation of the air bag table 1, so that the air bag table 1 provides cushioning effect to the passenger to safely protect the passenger. The strength of the seal plate $3_2$ and the size of the opening $1_1$ are selected to ensure such an effect.

Figure 9:
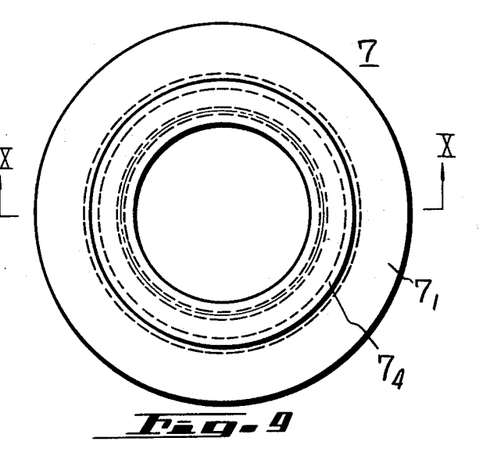
FIG. 9 is an enlarged plan view showing one example of an exhaust valve used in this invention.
Figure 10:
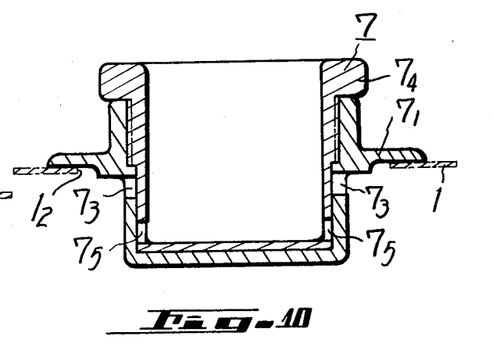
FIG. 10 is a longitudinal-sectional view taken along the line X—X in FIG. 9.
Figure 11:
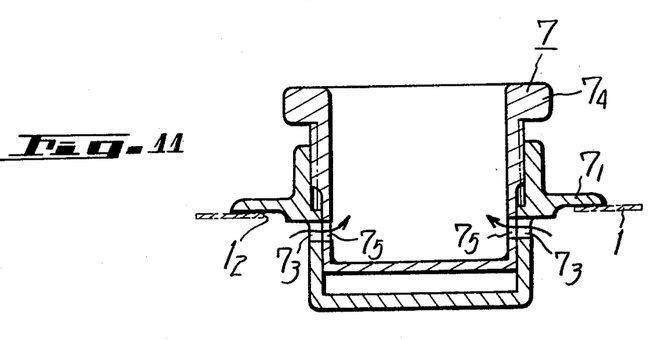
FIG. 11 is a longitudinal-sectional view, similar to FIG. 10, for explaining the operation of the exhaust valve depicted in FIGS. 9 and 10.

FIGS. 9 to 11 are respectively enlarged top plan and side views showing one example of the aforementioned exhaust valve or plug 7. Reference numeral $7_1$ indicates a tube with one end closed, whose flange is hermetically fastened to the margin of an opening $1_2$ formed in, for example, the upper side wall of the air bag table 1 and the tube $7_1$ has bored therein openings $7_3$. Reference numeral $7_4$ indicates a tubular plug with one end closed, which is screwed into the tube $7_1$ in an airtight manner and openings $7_5$ are formed in the tubular portion of the plug $7_4$ in the vicinity of its closed end. In FIG. 10 the openings $7_3$ of the tube $7_1$ are not aligned with those $7_5$ of the plug $7_4$, in which case the air bag table 1 is held airtight. While, in FIG. 11 the plug $7_4$ is shown to have been turned relative to the tube $7_1$ to bring its openings $7_5$ into alignment with those $7_3$ of the tube $7_1$. Accordingly, in this case the air bag table 1 is open to the air. Namely, air in the air bag table 1 can be freely released to the outside through the exhaust valve 7 as shown by arrows.

Figure 12:
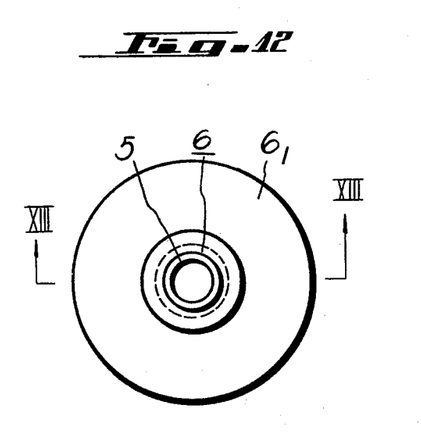
FIG. 12 is an enlarged plan view showing one example of a check valve used in this invention.
Figure 13:
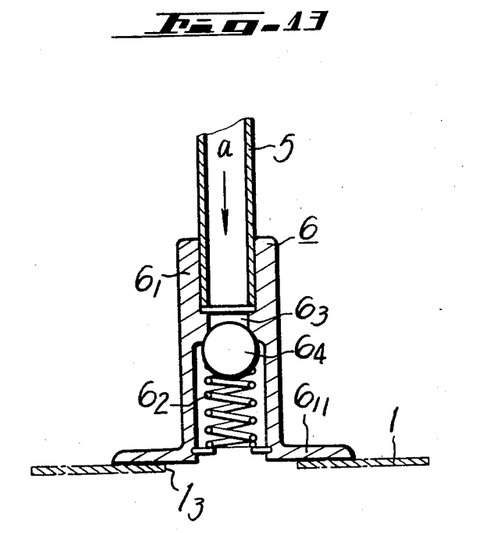
FIG. 13 is a longitudinal-sectional view taken along the line XIII—XIII in FIG. 12.

FIGS. 12 and 13 are respectively enlarged plan and cross-sectional views showing one example of the aforementioned check valve 6 employed in the present invention. The check valve 6 consists of a pipe $6_1$ having its flange $6_{11}$ hermetically fastened to the margin of an opening $1_3$ in the side wall of the air bag table 1, a spring $6_2$ disposed in the pipe $6_1$ and a ball $6_4$ pressed by the spring $6_2$ to close a narrow path $6_3$ in the pipe $6_1$. When air is supplied in a direction of an arrow $a$ through the pipe 5, the ball $6_4$ is pressed down against the force of the spring $6_2$ to provide a gap between the ball $6_4$ and the narrow path $6_3$ to permit delivery of air into the air bag table 1. Stopping the delivery of air, the ball $6_4$ is pressed again by the spring $6_2$ to close the narrow path $6_3$, so that air in the air bag table 1 cannot be released to the outside through the path $6_3$.

The inflation of the air bag table 1 may take place by means of, for example, an electromotive compressor or the like (not shown), in which case air can be automatically delivered only by depressing a switch button into the air bag table 1 through the air supply pipe 5 and the check valve 6. It is also possible to employ a high-pressure gas cylinder, a grip type pump, foot pump or the like for the inflation of the air bag table 1. The air bag table 1 may be inflated by breathing thereinto through a rubber pipe connected to the pipe 5. In the case of using the compressor or the high-pressure gas cylinder for putting air into the air bag table 1, it is preferred to employ an automatic control device for the internal pressure of the air bag table 1.

While, the fixture 2 attached to the air bag table 1 is made of, for example, a resilient metal substantially in a U-letter configuration and may be mounted on the back of the seat by means of harness snap (detachably) or may be screwed directly to the seat or attached to the framework of the seat.

Figure 14:
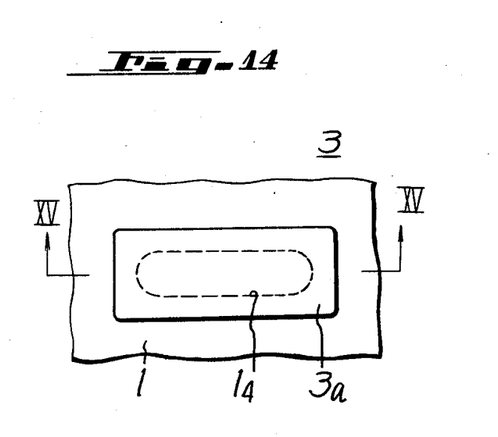
FIG. 14 is an enlarged plan view illustrating a modified form of the safety valve.
Figure 15:
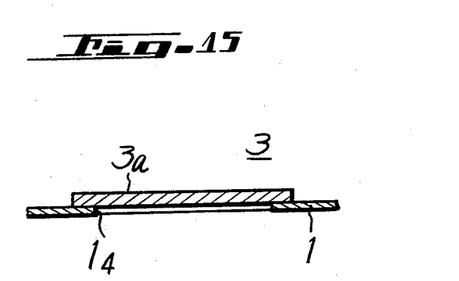
FIG. 15 is a longitudinal-sectional view taken along the line XV—XV in FIG. 14.

Referring now to FIGS. 14 and 15, a description will be given of a modified form of the pressure regulator device 3 for discharging air sealed in the air bag table 1 when the passenger strikes against it to cause a sudden rise of its internal pressure. In the present example there is formed, for example, in the side wall of the air bag table 1 an opening $1_4$ which is large enough to permit the passage therethrough of air in the air bag table 1 at a suitable speed, and the opening $1_4$ is hermetically sealed from the outside with a film $3a$ formed of the same material as that of the air bag table 1 but thinner than the latter. When a travelling vehicle is involved in a collision, the object of the so-called secondary collision that a passenger is thrown against the vehicle compartment by inertia is the air bag table 1, and consequently its internal pressure rides suddenly. Then, the film $3a$ is ruptured, by which air in the air bag table 1 is automatically released to the outside through the opening $1_4$ to thereby rapidly lower the internal pressure of the air bag table 1. Thus, the air bag table 1 alleviates and absorbs inertia of the passenger thrown against it without rendering reaction to him, thereby protecting him from injury due to the so-called secondary collision.

Figure 16:
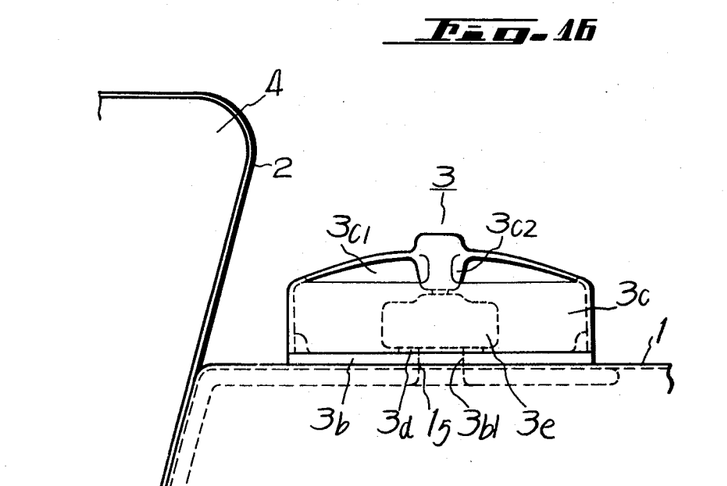
FIG. 16 is an enlarged side view showing another modified form of the safety valve.
Figure 17:
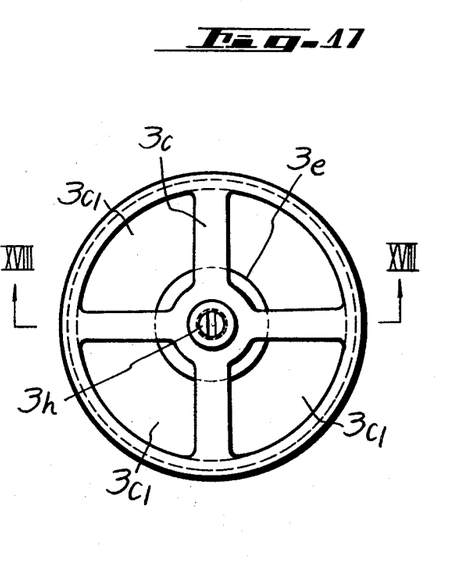
FIG. 17 is a plan view of the safety valve depicted in FIG. 16.
Figure 18:
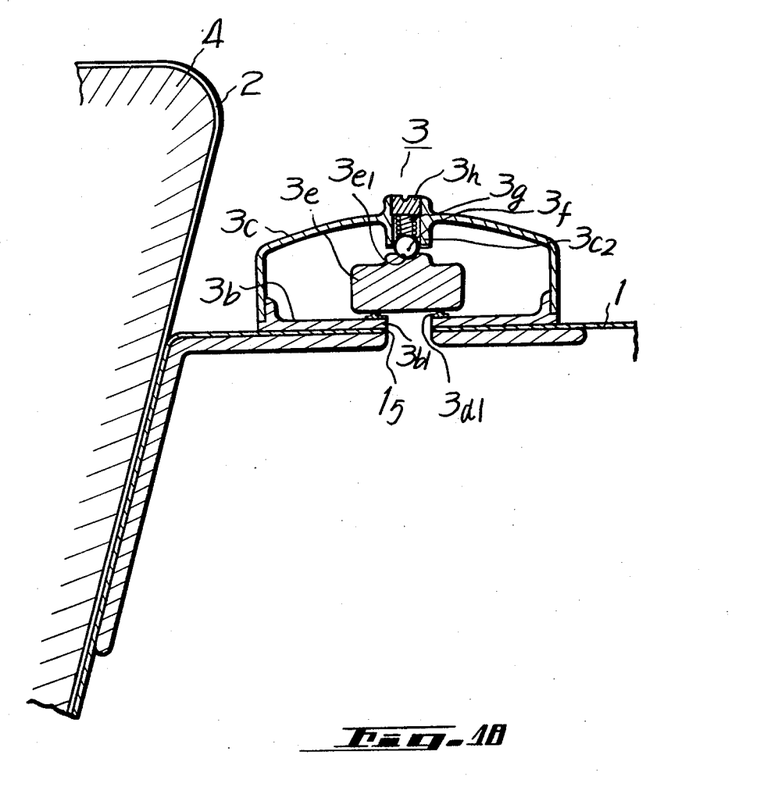
FIG. 18 is a sectional view taken along the line XVIII—XVIII in FIG. 17.

FIGS. 16, 17 and 18 show other modified forms of the pressure regulator device or safety valve 3 which is adapted to automatically deflate the air bag table 1 upon occurrence of a collision and absorb inertia of a vehicle passenger striking against the air bag table 1 without rendering reaction to him thereby to protect him from injury. In the illustrated example there is formed, for example, in the upper portion of the air bag table 1 an exhaust port $1_5$ large enough to permit release of the sealed air in the air bag table 1 at a suitable speed and, for example, a disc-shaped base plate $3b$ having bored therein an opening $3b_1$ similar to the exhaust port $1_5$ is hermetically fastened to the air bag table 1 in such a manner that the opening $3b_1$ is aligned with the exhaust port $1_5$ and a cup-shaped cover $3c$ is screwed on to the base plate $3b$ at its periphery. While, openings $3c_1$ for discharging air in the air bag table 1 is formed in the cover $3c$ at its top.

Around the centrally disposed opening $3b_2$ of the disc-shaped base plate $3b$ there is secured thereto a circular sealing member or packing $3d$ having formed therein an aperture $3d_1$ and made of a slippery or sleek and airtight material such as Teflon or the like in such a manner that the openings $3b_1$ and $3d_1$ may be aligned with each other and, for example, a round weight $3e$ as of iron is disposed on the sealing member $3d$ to normally close the aperture $3d_1$. A slight depression $3e_1$ is formed on the top of the weight $3e$ centrally thereof. A ball $3f$ is fitted in the depression $3e_1$ and is rotatably enclosed in a ball receiver $3c_2$ formed centrally on the inside of the cover $3c$ at the top thereof, while, at the same time, being pressed against the weight $3e$ by a compression spring $3g$ inserted in the ball receiver $3c_2$. In this case, a screw $3h$ is screwed down into the ball receiver $3c_2$ to be brought into contact with the free end of the spring $3g$ and the ball $3f$ is pressed against the weight $3e$ at a suitable pressure by adjusting the screw $3h$. Reference numeral 10 indicates a support plate as of synthetic resin which is fastened to the interior of the air bag table 1 in a manner to maintain the pressure regulator device 3 in the horizontal position for ensuring transmission of inertial movement to the pressure regulator device 3.

A description will be given of the operation of the pressure regulator means 3. When a travelling vehicle with the air bag table 1 inflated is involved in a collision, its passenger is thrown against the air bag table 1 by inertia but before the passenger strikes against the air bag table 1, namely at the moment of crash, inertia of the weight $3e$ of the pressure regulator means 3 provided in the air bag table 1 overcomes the pressing force of the compression spring $3g$ due to the impact of the crash and moves or slides out of its normally seated position in a horizontal plane. Namely, the weight $3e$ is thrown out of position in which to close the openings $3b_1$ and $1_5$ as shown and these openings are exposed or opened, so that the sealed air in the air bag table 1 is automatically released through these openings and that $3c_1$. Accordingly, when the passenger is thrown against the air bag table 1 by the inertia, the pressure regulator device 3 shall have already been rendered open and the passenger strikes against the air bag table 1 under such conditions, so that the air sealed in the air bag table 1 is released to the outside to gradually decrease the internal pressure of the air bag table 1. Consequently, the passenger thrown against the air bag table 1 is not ever subjected to reaction resulting from sudden increase in the internal pressure of the air bag table 1 due to inertial force of the passenger's body and the air bag table 1 performs the function of a perfect cushion to alleviate and absorb shocks, thereby protecting the passenger from an accident resulting from the so-called secondary collision.

Figures 19, 22A, 22B, 22C:
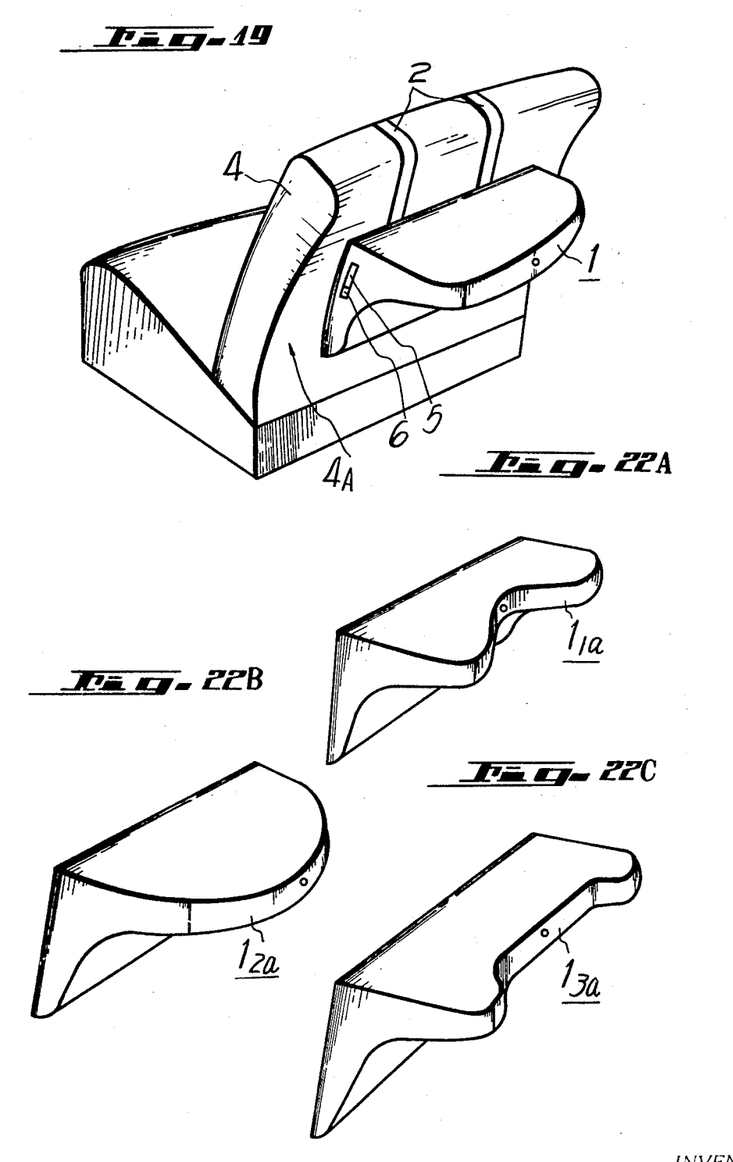
FIG. 19 is a perspective view showing a modification of the air bag table when mounted on the seat of a vehicle.
FIGS. 22A, 22B and 22C are perspective views showing other modifications of the air bag table of this invention.
Figures 20, 21:
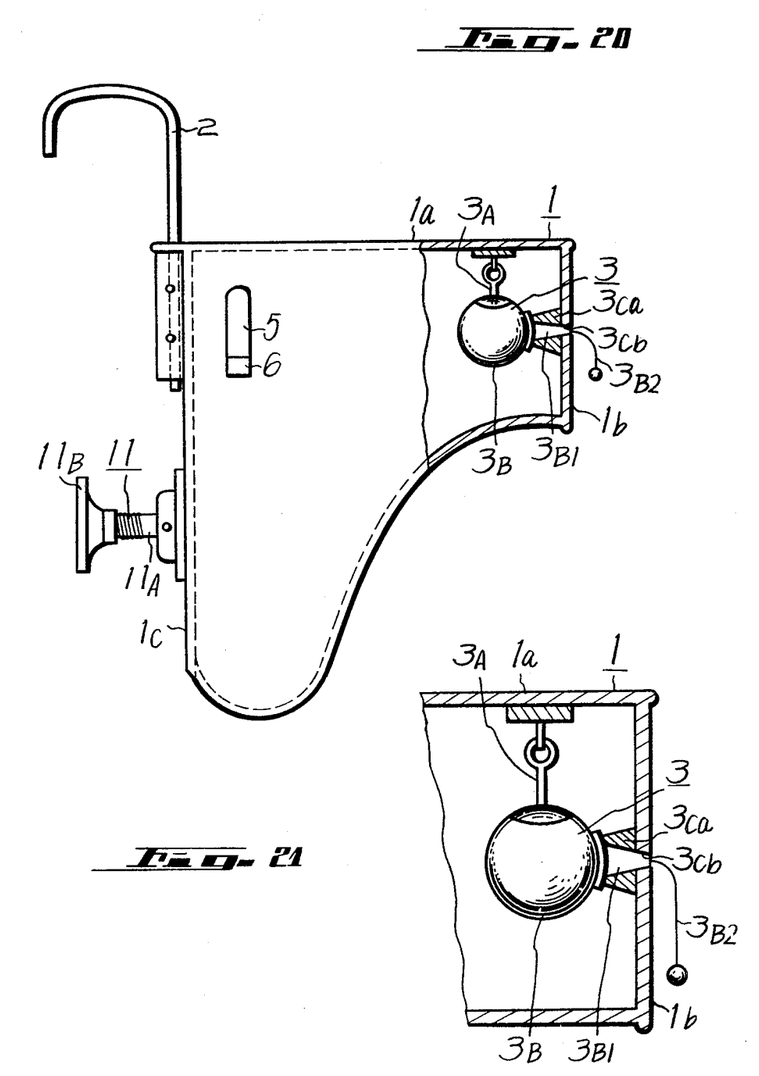
FIG. 20 is an enlarged side view, partly cut away, of the air bag table shown in FIG. 19.
FIG. 21 is an enlarged diagram showing one portion of the air bag table depicted in FIG. 20.

In FIGS. 19, 20 and 21 there is illustrated another modification of the air bag table 1 of this invention, in which reference numerals similar to those in the foregoing indicate similar components. The present example is different from the foregoing examples in the provision of an automatic pressure regulator device 3 which is disposed inside of the air bag table 1 and adapted to initiate automatic deflation of the air bag table 1 when an impact produced in a travelling vehicle exceeds a predetermined value. In the illustrated example the automatic pressure regulator device 3 is made up of a rod 3A pivoted at one end to, for example, the upper flat portion $1a$ of the air bag table 1, a substantially spherical weight 3B made of, for example, iron or the like and attached to the free end (the lower end) of the rod 3A and an opening $3_{cb}$ bored in one vertical flat portion $1_b$ of the air bag table 1. The weight 3B has a projection $3B_1$ and a cord $3B_2$ is fixed to the free end of the projection $3B_1$, one end of the cord $3B_2$ being retained outside of the air bag table 1. The opening $3_{cb}$ has a projecting tube $3_{ca}$ projecting inwardly of the air bag table 1.

In the case of putting air into the air bag table 1 through the pipe 5 and the check valve 6, the cord $3B_2$ is pulled by hand to insert the projection $3B_1$ of the weight 3B into the projecting tube $3_{ca}$ of the opening $3_{cb}$. Thus, the air bag table 1 is inflated in a predetermined shape as shown. Namely, under such conditions, the rod 3A of the pressure regulator device 3 is substantially vertical and the projection $3B_1$ of the weight 3B is hermetically fitted in the projecting tube $3_{ca}$ of the opening $3_{cb}$, so that air sealed in the air bag table 1 cannot be released out therefrom. It will be seen that under such conditions, the upper flat portion $1a$ of the air bag table 1 is held substantially horizontal and that the air bag table 1 performs the function of a usual table.

Assume that when a travelling vehicle having the air bag table inflated in the above conditions is involved in, for example, a head-on collision, an inertial force of, for example, about 15G is caused in the weight 3B. If the frictional force for the engagement of the projection $3B_1$ with the inwardly projecting tube $3_{ca}$ of the opening $3_{cb}$ is previously selected smaller than the inertial force of 15G, the projection $3B_1$ of the weight 3B is forwardly thrown out from the opening $3_{ca}$ in the event of the collision. In this case, when a vehicle passenger or other object in the vehicle compartment strikes against the air bag table 1 air sealed therein is discharged through the opening $3_{cb}$ to automatically deflate the air bag table 1. Accordingly, the air bag table 1 renders no reaction to the passenger thrown thereagainst and absorbs a shock given to him to thereby protect his like.

The condition for the disengagement of the weight 3B from the opening $3_{cb}$, namely the value of an impact detected by the weight 3B need not be limited specifically to 15G. Since the value of the impact detected by the weight 3B is dependent mainly upon the frictional force between the projection $3B_1$ of the weight 3B and the inwardly projecting tube $3_{ca}$ of the opening $3_{cb}$, the value of the impact can be adjusted at will by suitably selecting, for example, the diameter of the projection $3B_1$ relative to those of the opening $3_{cb}$ and the inwardly projecting tube $3_{ca}$ or selecting the material of them or forming suitable depressions on their engagement faces. Further, the value of the impact detected by the weight can also be adjusted by suitably selecting inclination of the rod 3A relative to a vertical direction. In practice, the value of the impact can be adjusted by suitable selection of the density or shape of the weight, too.

In FIG. 20 reference numeral 11 indicates generally one example of a device for adjusting the position of the upper flat portion $1a$ of the air bag table 1 to be substantially horizontal when the air bag table 1 has been mounted by the fixture 2 on the seat 4. This adjusting device 11 comprises a bolt 11A fixed at one end to one side $1c$ of the air bag table 1 opposite from the side $1b$ and a pad or adsorbing plate 11B threadably engaged with the free end of the bolt 11A. The adsorbing plate 11B adsorbs or rests on the back 4A of the seat 4 when the air bag table 1 is mounted on the seat 4. By moving adsorbing plate 11B on the bolt 11A under such conditions, the flat portion $1a$ of the air bag table 1 is adjusted to be horizontal.

FIGS. 22A, 22B and 22C show other modified forms of the air bag table of this invention which are different in shape from that above described. Although not shown, these air bags $1_{1a}$, $1_{2a}$ and $1_{3a}$ are provided with exactly the same means as those above described and yield exactly the same operational effects as those previously described. That is, the shape of the air bag table can be freely selected according to the kind and shape and the like of a vehicle in which the air bag table is to be installed.

When the air bag tables are not practically used, they can be folded down with ease by inwardly pushing the projection $3B_1$ of the weight 3B and by deflating the air bag tables through the opening $3_{cb}$ and when they are in deflated condition they do not ever impede any motion of the passenger in the vehicle compartment as in the foregoing example.

The following Table shows one example of experimental results as to how much a vehicle passenger in the rear seat 4' could be protected from injury by the air bag table of this invention mounted on the back of the front seat 4 in the event of a collision of a vehicle, for example, an airplane, an automobile or the like, as compared with a conventional safety belt.

Experimental Data obtained at Yatabe
Reported by Japan Automobile Manufactures Association
Published Oct., 1966

EXAMPLE II

| Condition | | Acceleration of Head in G | | Injuries to human body (presumed) |
|---|---|---|---|---|
| Safety belt | Air bag table | Vertical direction | Horizontal direction | |
| Used | 1 | 11.8 | 24.3 | Not injured. |
| Do | (¹) | 66.0 | 134.4 | Killed instantaneously. |
| Not used | 1 | 16.5 | 17.8 | Not injured. |

¹ Not used.

NOTE.—In the event of a collision 50G regarded as critical limit of the life of a passenger, so that his life can be protected by the provision of the air bag table of this invention.

As will be apparent from the above Table, an inertial movement of an acceleration of, for example, 134.4G in the event of an automobile accident can be alleviated by the air bag table of this invention to an inertial movement of an acceleration of 17.8G. Accordingly, it has been proved that the air bag table of this invention could well protect the life of the passenger when involved in a collision which would produce an acceleration of about 134.4G.

According to a report issued by the Biodynamics Section (Impact Test) of Aeromedical Laboratory of JASDAF observing injuries to the Human body in Airplane accidents, the injuries are generally centered at the foreheads and knees of the passengers. The air bag table of this invention is inwardly curved to conform with the figure of a sitting passenger from his knee to breast and is disposed between the passenger and the front seat, so that in the event of a collision he is prevented by the air bag table from moving vertically and he moves by inertia only in a horizontal direction. Accordingly, the upper half of his body is received softly by the air bag table disposed between him and the front seat as above described to thereby protect his bust.

Although the present invention has been described in connection with the case where the air bag table is mounted on the back of the front seat in the vehicle compartment, it will be readily understood that the air bag table can be installed at any desired position other than the back of the front seat by suitably designing the fixture 2 or by means of bolts or the like.

It will be apparent that many modifications and variations may be effected without departing from the scope of the novel concepts of this invention.

I claim as my invention

1. An air bag table for use in vehicles comprising an air bag which can not stand by itself but is capable of being inflated with a gas and forming an air bag table with a substantially flat plane at one portion, fixture means for mounting the air bag near a vehicle passenger in the vehicle compartment, means for sealing the gas in the air bag, and pressure regulator means for automatically discharging the sealed gas from the air bag in the case of sudden rise of the pressure of the sealed gas resulting from striking of the passenger against the inflated air bag table due to an external shock said air bag table has formed therein a plurality of diaphragms for ensuring maintenance of the air bag table in a predetermined shape when inflated.

2. An air bag table as claimed in claim 1 which further includes means for maintaining the upper surface of the air bag table substantially horizontal when it is inflated.

3. An air bag table as claimed in claim 1 which is substantially L-shaped in cross-section when inflated, its horizontal portion corresponding to the knee and breast of a passenger sitting in a seat to thereby prevent the vertical movement of the passenger.

4. An air bag table as claimed in claim 1 wherein the pressure regulator means comprises a disc fastened to the air bag on the outside thereof, the disc having an opening aligned with an opening bored in the air bag, a cover having openings and secured to the margin of the disc, a weight disposed on the opening of the disc and normally closing the two openings, and a spring means provided in the cover for pressing the weight, the force of the spring means being adjusted so that when the weight is supplied with a force exceeding a predetermined value resulting from the accident of the travelling vehicle, the weight moves against the force of the spring means to open the openings of the air bag and the disc, thereby automatically discharging air sealed in the air bag.

5. An air bag table as claimed in claim 1 wherein the pressure regulator means comprises a weight having a projection and suspended in the air bag table as a pendulum and an opening formed in the air bag for receiving the projection, the pressure regulator means being adapted so that when a force exceeding a predetermined value is rendered to the weight, the projection disengages from the opening of the air bag to automatically discharge air in the air bag to absorb impact of the passenger thrown thereagainst to protect him without rendering any reaction to him.

6. An air bag table as claimed in claim 5 wherein a cord is fixed at one end to the top of the projection formed on the weight and the other end of the cord is led out from the air bag so as to facilitate engagement and disengagement of the projection with and from the opening of the air bag.

7. An air bag table as claimed in claim 1 wherein the pressure regulator means comprises an opening formed in the air bag and a thin film normally closing the opening in an airtight manner, the film being more readily ruptured than the air bag to discharge air sealed in the air bag when the pressure in the air bag is increased as compared with the normal value.

* * * * *